Aug. 12, 1941.  F. W. BURGER  2,252,163
WHEEL
Filed Oct. 13, 1938   2 Sheets-Sheet 1
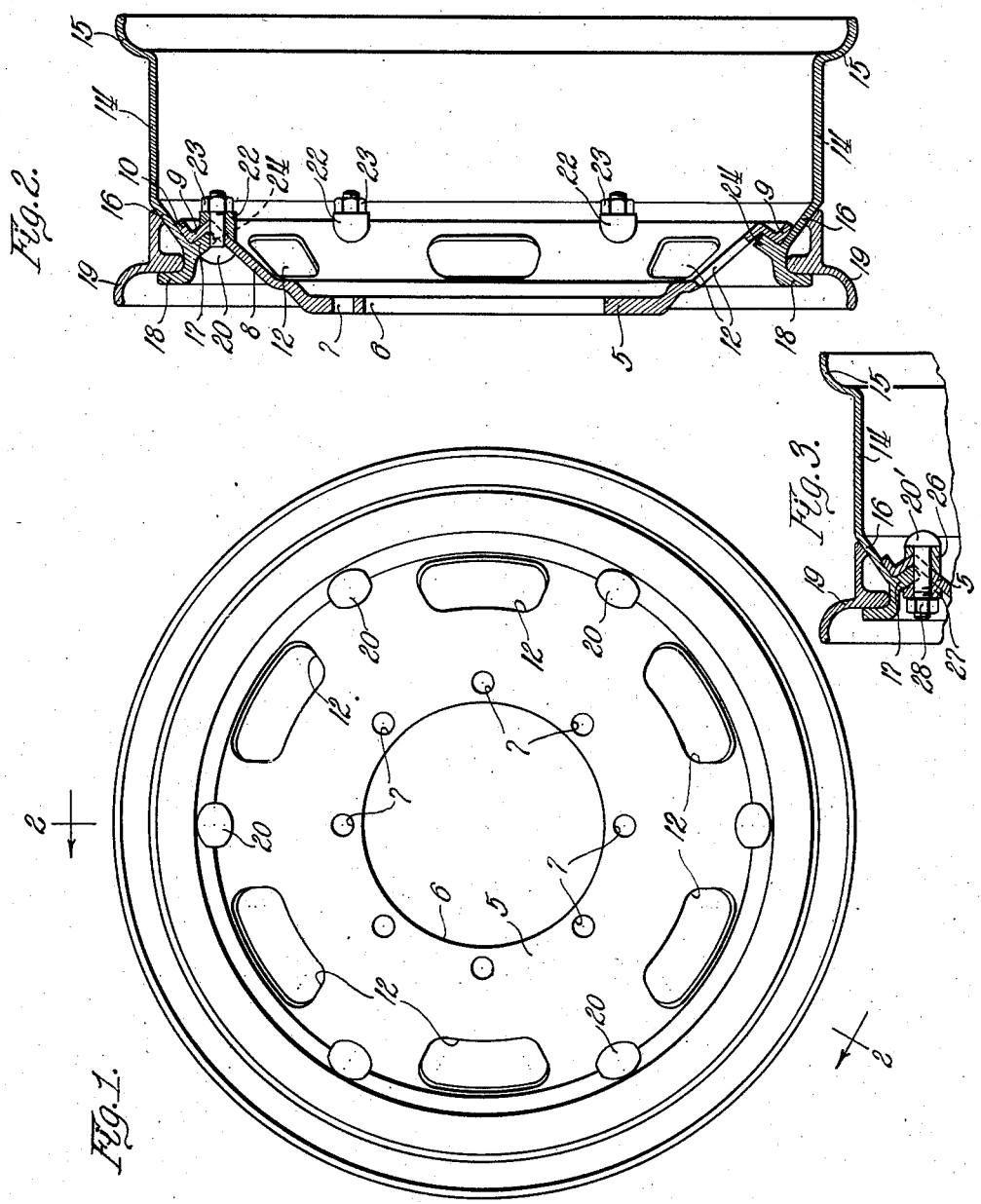
INVENTOR.
FREDERICK W. BURGER.
BY Walter E. Schirmer
ATTORNEY.

Aug. 12, 1941.   F. W. BURGER   2,252,163
WHEEL
Filed Oct. 13, 1938   2 Sheets-Sheet 2
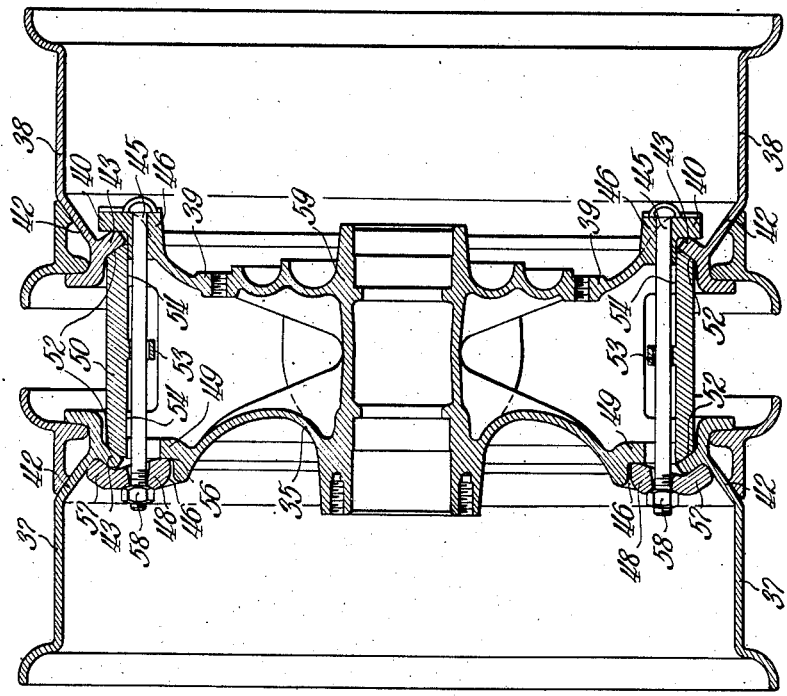
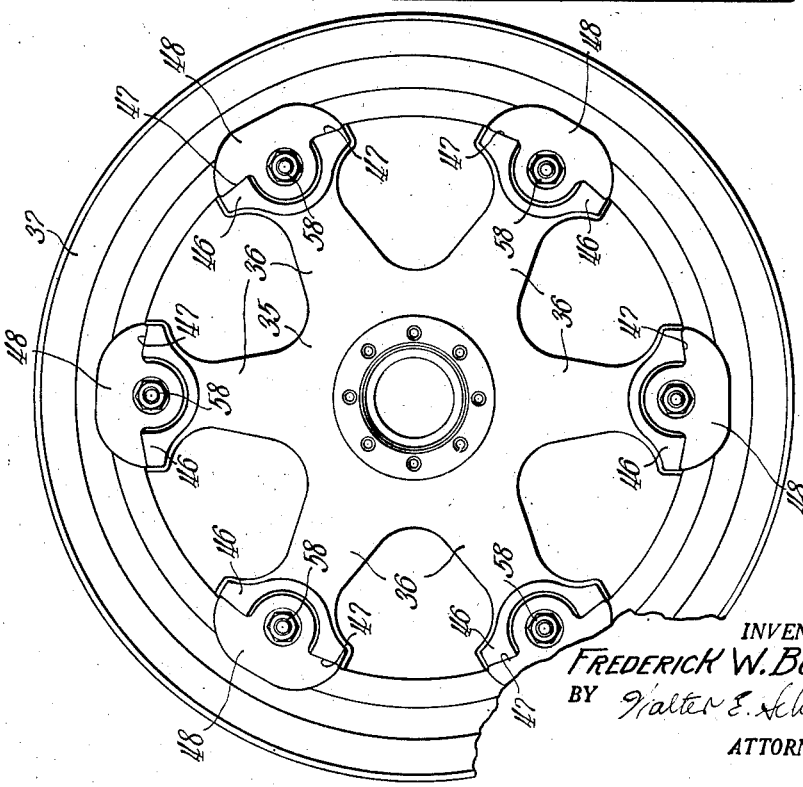
INVENTOR.
FREDERICK W. BURGER
BY Walter E. Schirmer
ATTORNEYS.

Patented Aug. 12, 1941

2,252,163

UNITED STATES PATENT OFFICE 2,252,163

WHEEL

Frederick W. Burger, Niles, Mich., assignor to Clark Equipment Company, Buchanan, Mich., a corporation of Michigan Application October 13, 1938, Serial No. 235,704

9 Claims. (Cl. 301—11)

This invention relates to wheels, and more particularly is directed to a wheel of the suspension type employing a special form of rim for making it of the readily demountable rim style.

One of the primary purposes of the present invention is to provide a wheel assembly incorporating a rim having means thereon whereby the rim may be readily clamped to either a disc or to a spoke wheel spider to secure it in a position for suspending the axle carried by the disc or spider from the wheel.

One of the primary advantages of the present construction is the design of the rim to adapt it for use with either a disc of more or less conventional construction, or to hollow spoked cast metal spiders of either the single or dual rim type.

Another feature of the present invention is to provide a wheel assembly in which the rims will be secured in positive lateral alinement in a dual wheel assembly.

Still another object of the present invention is to provide a construction in which there can be no possibility of a chucking action between the rim and supporting spider or disc, and the rim will be positively fixed against lateral displacement relative to its support.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is an elevational view of a disc wheel embodying the present invention;

Figure 2 is a sectional view taken substantially on line 2—2 of Figure 1;

Figure 3 is a partial sectional view of a modified disc wheel mounting;

Figure 4 is an elevational view of the present invention as adapted to a cast metal wheel assembly;

Figure 5 is a sectional view taken substantially on line 5—5 of Figure 4.

Considering now in detail the embodiment of the invention shown in Figures 1 and 2, a disc 5 is provided having a central aperture 6 adapted to fit over a conventional type of hub and provided with the circumferentially spaced openings 7 arranged about the central aperture 6 for receiving suitable studs whereby the disc may be clamped to the hub.

The disc has an intermediate substantially frusto-conical portion 8 which terminates at the peripheral edge thereof in an axially facing V-shaped bead comprising the flange portions 9 and 10 which extend substantially at right angles to each other, each being inclined at an angle of substantially 45° with respect to the axis of the disc. The peripheral portion of the disc is provided with a plurality of circumferentially spaced openings formed substantially at the meeting edges of the flange 9 and the end of the frusto-conical section 8, and is also provided with a series of spoke-like openings 12 for the purpose of lightening the weight of the disc and giving it a generally spoked appearance.

A rim 14 is provided having at one lateral edge thereof the bead supporting portion 15, and having the opposite lateral edge formed to provide a gutter edge mounting portion 16. The portion 16 of the rim has a normally extending flange 17 which may be formed integral with the rim, may be welded or otherwise secured thereto, and may be continuous in an annular direction, or may consist of circumferentially spaced lip or tongue portions. Beyond the flange 17 the opposite edge of the rim is turned up as indicated at 18 to provide a locking support for the gutter ring 19 forming the opposite bead flange.

The rim 14 is secured to the periphery of the spider 8 by a series of circumferentially spaced bolts 20 which have the head portions thereof more or less wedge shaped to fit tightly in the space between the outer surface of the flange 17 and the frusto-conical portion 8 of the disc 5.

The bolts 20 extend through apertures in the edge of the disc 5, and are adapted to receive suitable block members 22 which have V-shaped slots therein fitting the axial inboard surface of the flanges 9 and 8. This serves to support the bolt 20 in axial position, and at the same time provides a flat surface against which the nuts 23 may be tightened to clamp the bolts in position for securing the rim positively on the disc. It will be noted that the flanges 16 and 17 of the rim 14 cooperate with the flanges 9 and 10 of the disc 5 in such manner as to provide an interlocking engagement therebetween which prevents any possible radial movement between the rim and the disc, and when the rim is wedged into position by means of the bolts 20 serves to rigidly secure the rim against displacement in any direction. By reason of this construction there is no chording action produced in the wheel assembly, and consequently a suspended type of wheel is provided in which the axle is supported from the disc 5 by means of the rim 14.

It will be noted that in the construction just described, the nuts 23 are disposed on the inside of the wheel, and consequently render it difficult to demount the rim in case of blowouts, punctures, or the like. Under such conditions, it is necessary that the disc 5 be removed from the hub before the rim can be dismounted.

However, in Figure 3 there is shown a modified form of this embodiment of the invention in which the clamping bolts 20″ corresponding to the clamping bolts 20 are reversed in direction and extend outwardly through the peripheral edge of the disc 5 and past the flange 17 with suitable lock members 26 and 27 engaging about the bolt on opposite sides of the disc 5 in order to maintain the bolt in axial position so that it may be properly drawn tight by the nut 28. With such an assembly it is obvious that the rim may be demounted from the disc 5 without requiring any detachment of the disc, and consequently a true demountable rim assembly is provided.

It should also be noted that the flange 17 has a notched-out portion 24 adapted to receive the shank of the bolt 20, thus serving to prevent any possible rotation of the rim 14 relative to the disc 5. This provides a driving connection assuring proper transmission of torque from the disc to the rim. Obviously, if lugs are employed in place of the flanges 17, the lugs could be provided with correspondingly notched portions for the same purpose.

Considering now the form of the invention shown in Figures 4 and 5, I have provided in this embodiment of the invention a dual wheel assembly in which two rims are supported on a single cast metal spider. In this form of the invention the wheel spider is indicated at 35 and includes a number of hollow radially extending spokes 36 which, at their outer ends, are formed to receive the rims 37 and 38. In the rear wall of each of the spokes 36 there is provided a boss 39 which is tapped to receive a bolt for clamping a suitable brake drum or the like to the rear of the wheel spider.

At the outer end of each of the spokes 36 there is provided a radially extending flange or lip 40 at the lateral inboard side thereof, this lip 40 serving as an abutment to limit lateral inward movement of the rim 38. It is to be pointed out that the rims 37 and 38 are of the same type as the rim 14 described in connection with the embodiment of the invention shown in Figures 1, 2 and 3, and are provided with the gutter edge portions 42 having the normally extending lip or flange portions 43. The lip 40 thus serves as a radial abutment to prevent or limit axial inward movement of the portion 43 of the rim 38. Disposed below the lip or flange 40 and extending transversely of each spoke end is a clamping bolt 45 which has its head portion non-rotatably locked at the inboard side of the outer end of the spoke being supported by a re-inforced boss portion 46 formed below the flange 40. The bolt 45 is adapted to project laterally outwardly of the outboard side of the spoke end through a U-shaped socket, shown more in detail in Figure 4 and indicated at 46. This socket is provided with spaced axially directed shoulders 47 adapted to form supports for the side wing portions of a rim clamping lug 48.

Disposed between the rims 37 and 38 and serving as a means for providing a definite spacing between the rims are spacer blocks 50 which preferably have tapered corners 52 engaging the inclined surface of the portions 43 of the rims. The blocks 50 are also provided with depending lug or shank portions 53 which are apertured to receive the bolt 45, consequently locking the spacer blocks 50 against displacement relative to the end of the spoke. The blocks 50 are supported on circumferentially axially machined surfaces 54 disposed on opposite sides of the shank 53 between the lip or flange 40 and the socket 46. The lugs 48 have a heel portion adapted to contact the inner radially extending wall 49 of the recess 46, as indicated at 56. The upper portion of the lugs 48 are angled in such manner as to interlock in the recess formed between the portions 42 and 43 of the rim 37 as indicated at 57, thereby serving to hold the rim 37 against the spacer block 50 and at the same time to clamp it against possible outward radial movement. A suitable clamping nut 58 is threaded on the end of the bolt 45 to move the lug inwardly within the recess 46, the lug 48 having wing portions sliding on the shoulders 47 defining the radial outer end of the recess 46.

In assembling the dual wheel construction thus far described, the rim 38 is first placed in position about the wheel spider and moved axially inwardly into engagement with the radial stops or flanges 40. The spacer blocks 50 are then moved into position with the depending shanks 53 interlocked with the bolt 45 to maintain them against displacement. It should be understood that the blocks 50 are of a width such as to have secure bearing on the surfaces 54 so that they may be moved axially inwardly to engage the bevel edge 52 thereof with the corresponding surface of the flange 43. The outer or outboard rim 37 is then placed in position resting on the inclined surface 52 of the block 50 at the outboard side thereof and the lugs 58 are engaged therewith.

Tightening of the nut 58 after these parts have been assembled in position results in axial pressure being applied to the bevel edge portion of the rim 37, which causes this rim to move axially inwardly forcing the blocks 50 axially inwardly into pressure contact with the rim 38. As a result, the entire assembly is moved axially inwardly until it is clamped in positive position between the shoulders 40 and the lugs 48. Inasmuch as no radial chording of the rims takes place due to the type of construction employed, the wheel becomes a suspension type assembly in which the axle shaft journal at the hub 59 of the spider 35 is suspended from the upper portions of the rims 37 and 38.

It will be apparent that inasmuch as the rim 38 is fixed against a positive radial abutment it can be machined into true planar alignment in a plane normal to the axis of the spider and the blocks 50 are all of the same dimensions, a substantially true alignment of the two rims in parallel relationship is provided, the planes of each of the rims being normal to the axis of the spider. This provides a wheel assembly having certain definite advantages for suspended type constructions, and also having positive lateral alignment.

In place of the spacer blocks 50 a continuous band type spacer may be employed if so desired. Also, it is to be understood that the lugs 48 may be changed slightly in appearance, depending upon the particular type of assembly used and the angular relationships between the portions 42 and 43 of the rim.

It is therefore believed apparent that I have provided a wheel assembly employing a novel type of rim which has certain distinct advantages of alignment, interlocking and clamping not possible with rims of the ordinary type.

I am aware that a number of changes can be made in certain of the details of the present invention, and I therefore do not intend to limit the present invention except as defined by the scope and spirit of the appended claims.

I claim:

1. A wheel assembly comprising a wheel spider having a peripheral portion comprising a radially and axially outwardly directed portion terminating in a radially outwardly and axially inwardly directed flange forming, in effect, an axially directed V-shaped section, a rim having a similar axially directed V-shaped section radially inwardly of one edge thereof, said rim being adapted to be mounted on said spider with said sections in laterally overlying position, and clamping means including opposed wedge shaped lugs on opposite sides of said overlying sections for clamping the same against relative lateral or radial movement.

2. A wheel assembly as set forth in claim 1 further characterized in that the innermost edge of said V-shaped rim section is provided with notched out portions adapted to engage about adjacent portions of said clamping means to form abutments preventing relative circumferential movement therebetween.

3. A wheel assembly as set forth in claim 1 wherein said spider comprises a disc having a frusto-conical section intermediate the hub portion and said peripheral portion, with said clamping means being circumferentially arranged at the intersection of said frusto-conical portion and said peripheral portion.

4. In combination, a wheel spider, a tire rim provided with a gutter type edge and having a radially and axially inwardly directed flange projecting from the gutter edge of said rim, a series of circumferentially spaced clamping bolts supported in said spider, an abutment on the periphery of said spider against which said flange is seated, and wedge-shaped lug means on said bolts for clamping said rim in position against said spider abutment to prevent any relative radial or axial movement therebetween.

5. In combination, a tire rim provided with a bevel edge at one side thereof and having a radially and axially inwardly directed flange projecting from the bevel edge thereof, a wheel spider having an abutment surface thereon forming an inclined seat for said flange, and clamping means circumferentially spaced about said spider radially inwardly of said surface and including wedge shaped lug means engaging said rim flange whereby tightening of said clamping means interlocks said rim and spider against relative axial or radial movement.

6. A demountable rim for a wheel assembly comprising an annular channel-shaped tire receiving portion, an internal frusto-conical flange at one edge portion, and an oppositely extending frusto-conical flange portion extending radially and axially inwardly from the small end of said first frusto-conical flange.

7. A demountable rim for a wheel assembly comprising an annular tire receiving portion having a gutter edge, and an internal axially inwardly opening frusto-conical flange portion joined to the gutter edge to form an internal axially inwardly opening V-shaped recess adjacent one lateral edge of said rim.

8. In combination, a tire receiving rim having an internal axially directed V-shaped flange portion opening inwardly adjacent one edge thereof, and a supporting spider having a corresponding axially directed V-shaped peripheral flange portion engaging the axial inward faces of said rim flange portion.

9. A rim for a wheel assembly of the class described comprising an annular cylindrical tire receiving portion defined at one end by a radial tire retaining flange and at the other end by a radially and axially inwardly directed edge forming an outwardly opening channel section for receiving an annular tire retaining flange member, and a frusto-conical flange formed integral with said edge and extending inwardly toward the midplane of the wheel to define with said edge an axially directed internal V-shaped recess.

FREDERICK W. BURGER.